(12) United States Patent
Jeong et al.

(10) Patent No.: US 12,271,051 B2
(45) Date of Patent: Apr. 8, 2025

(54) LENS ASSEMBLY DRIVING APPARATUS AND CAMERA MODULE COMPRISING SAME

(71) Applicant: LG INNOTEK CO., LTD., Seoul (KR)

(72) Inventors: Seung Hyeon Jeong, Seoul (KR); Bon Seok Ku, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 673 days.

(21) Appl. No.: 17/617,858

(22) PCT Filed: Jun. 2, 2020

(86) PCT No.: PCT/KR2020/007137
§ 371 (c)(1),
(2) Date: Dec. 9, 2021

(87) PCT Pub. No.: WO2020/251203
PCT Pub. Date: Dec. 17, 2020

(65) Prior Publication Data
US 2022/0244485 A1    Aug. 4, 2022

(30) Foreign Application Priority Data

Jun. 13, 2019  (KR) .......... 10-2019-0070299
Jul. 22, 2019  (KR) .......... 10-2019-0088506

(51) Int. Cl.
*G02B 7/08*  (2021.01)
*G02B 7/10*  (2021.01)
(Continued)

(52) U.S. Cl.
CPC .......... *G02B 7/08* (2013.01); *G02B 7/102* (2013.01); *G02B 27/646* (2013.01); *H04N 23/54* (2023.01); *H04N 23/57* (2023.01); *H04N 23/687* (2023.01)

(58) Field of Classification Search
CPC ........ G02B 7/08; G02B 7/102; G02B 27/646; G02B 7/021; G02B 7/09; H04N 23/54;
(Continued)

(56) References Cited

U.S. PATENT DOCUMENTS 9,774,787 B2    9/2017  Miller et al.
2015/0070781 A1  3/2015  Cheng et al.
(Continued)

FOREIGN PATENT DOCUMENTS

CN    1094820 A      11/1994
CN    201489175 U    5/2010
(Continued)

*Primary Examiner* — Shahbaz Nazrul
(74) *Attorney, Agent, or Firm* — Birch, Stewart, Kolasch & Birch, LLP

(57) ABSTRACT

The present embodiment relates to a lens assembly driving apparatus comprising: a first driving unit disposed in a housing; a lens assembly disposed in the housing; and a second driving unit disposed in the lens assembly and facing the first driving unit, wherein on the basis of an optical axis direction, a first length of the first driving unit is longer than or equal to a first length of the second driving unit, and on the basis of a direction perpendicular to the optical axis direction, a second length of the first driving unit is shorter than a second length of the second driving unit.

19 Claims, 12 Drawing Sheets

(51) Int. Cl.
*G02B 27/64* (2006.01)
*H04N 23/54* (2023.01)
*H04N 23/57* (2023.01)
*H04N 23/68* (2023.01)

(58) Field of Classification Search
CPC ...... H04N 23/57; H04N 23/687; H04N 23/60; G03B 2205/0015; G03B 2205/0046; G03B 2205/0069; G03B 3/10; G03B 5/02; G03B 5/00; G03B 13/36; H02K 41/031
See application file for complete search history.

(56) References Cited

U.S. PATENT DOCUMENTS

| | | | |
|---|---|---|---|
| 2017/0052388 A1 | 2/2017 | Kim et al. | |
| 2018/0364450 A1 | 12/2018 | Lee et al. | |
| 2018/0367714 A1* | 12/2018 | Im | H04N 23/687 |
| 2019/0098182 A1 | 3/2019 | Byon et al. | |
| 2019/0377155 A1* | 12/2019 | Bachar | H04N 23/55 |
| 2020/0137274 A1* | 4/2020 | Lee | G03B 17/17 |

FOREIGN PATENT DOCUMENTS

| | | |
|---|---|---|
| CN | 105227819 A | 1/2016 |
| CN | 107885010 A | 4/2018 |
| JP | 8-149777 A | 6/1996 |
| JP | 2014-48320 A | 3/2014 |
| KR | 10-2007-0012588 A | 1/2007 |
| KR | 10-2018-0116131 A | 10/2018 |
| KR | 10-2018-0137278 A | 12/2018 |
| KR | 10-2019-0034876 A | 4/2019 |

\* cited by examiner

LENS ASSEMBLY DRIVING APPARATUS AND CAMERA MODULE COMPRISING SAME

CROSS REFERENCE TO RELATED APPLICATIONS

This application is the National Phase of PCT International Application No. PCT/KR2020/007137, filed on Jun. 2, 2020, which claims priority under 35 U.S.C. § 119(a) to Patent Application No. 10-2019-0070299, filed in the Republic of Korea on Jun. 13, 2019 and Patent Application No. 10-2019-0088506, filed in the Republic of Korea on Jul. 22, 2019, all of which are hereby expressly incorporated by reference into the present application.

TECHNICAL FIELD

The present invention relates to a lens assembly driving apparatus and a camera module comprising the same.

BACKGROUND ART

The camera module photographs a subject and stores it as an image or video, and is installed in mobile terminals such as cell phones, laptops, drones, and vehicles.

Meanwhile, portable devices such as smartphones, tablet PCs, and laptops have built-in ultra-small camera modules, and such a camera module may perform an autofocus (AF) function that automatically adjusts the distance between the image sensor and the lens to align the focal lengths of the lenses.

In addition, recent camera modules can perform a zooming function of zooming up or out by increasing or decreasing the magnification of a distant subject through a zoom lens.

In addition, recent camera modules employ image stabilization (IS) technology to correct or prevent image shake due to camera movement caused by unstable fixing devices or user movement.

In such image stabilization (IS) technologies, there are optical image stabilizer (OIS) technology, image shake prevention technology using an image sensor, and the like.

OIS technology is a technology that corrects movement by changing the path of light, and image shake prevention technology using an image sensor is a technology that corrects movement by mechanical and electronic methods, and OIS technology is being adopted more and more.

Meanwhile, a zoom actuator is used for the zooming function in the camera module, and friction torque is generated when the lens is moved due to the mechanical movement of the actuator, and such frictional torque causes technical problems such as a decrease in driving force, an increase in power consumption, or a decrease in control characteristics.

In particular, in order to obtain the best optical characteristics using a plurality of zoom lens groups in the camera module, the alignment between the plurality of lens groups and the alignment between the plurality of lens groups and the image sensor must be well matched, but when decent in which the center of the spherical surface between the lens groups deviates from the optical axis, or tilt which is a phenomenon of lens tilt, or a phenomenon of misalignment between the central axes of the lens group and the image sensor occurs, the angle of view is changed or the out-of-focus occurs, thereby adversely affecting image quality or resolution power.

Meanwhile, when increasing the separation distance in the area where friction occurs to reduce friction torque resistance when moving the lens for zooming function in the camera module, a technical inconsistency problem occurs, in which a lens decent or a lens tilt is deepened when a zoom movement or a zoom movement is reversed.

Meanwhile, the image sensor has a higher resolution as it goes to a higher pixel, and the size of a pixel becomes smaller, and as the pixel becomes smaller, the amount of light received at the same time decreases. Therefore, the higher the resolution of the camera, the more severe the image shake due to hand shake that occurs when the shutter speed is slowed in a dark environment.

Accordingly, the OIS function has recently been essentially adopted in order to capture an image without deformation using a high-pixel camera in a dark night or in a moving picture.

Meanwhile, OIS technology is a method of correcting image quality by moving the lens or image sensor of the camera to correct the optical path, and in particular, OIS technology detects camera movement through a gyro sensor and calculates a distance that a lens or image sensor should move based on this.

For example, the OIS correction method comprises a lens movement method and a module tilting method. In the lens movement method, only the lens in the camera module is moved to realign the center of the image sensor and the optical axis. On the other hand, the module tilting method is a method of moving the entire module comprising the lens and image sensor.

Especially, the module tilting method has a wider correction range than the lens movement method, and since the focal length between the lens and the image sensor is fixed, there is an advantage in that image deformation can be minimized.

Meanwhile, in the case of the lens movement method, a position recognition sensor, for example, a Hall sensor is used to detect the position and movement of the lens. On the other hand, in the module tilting method, a photo reflector is used to detect the movement of the module. However, both methods use a gyro sensor to detect the movement of the camera user.

The OIS control unit uses the data recognized by the gyro sensor to predict where the lens or module should move to correct the user's movement.

According to the recent technology trend, ultra-slim and ultra-small camera modules are required, but there is a space limitation for OIS operation in the ultra-small camera module, so there is a problem in that it is difficult to implement the OIS function applied to general large cameras, and when OIS driving is applied, there is a problem in that an ultra-slim and ultra-small camera module cannot be implemented.

In addition, in the conventional OIS technology, within the limited size of the camera module, as the OIS driving unit is disposed on the side of the solid lens assembly, there is a problem in that the size of the lens to be used for OIS is limited, making it difficult to secure the amount of light.

In particular, in order to obtain the best optical properties from the camera module, the alignment between the lens groups must be good when implementing OIS through lens movement or module tilting, but in the OIS technology of the prior art, when decent in which the center of the spherical surface between the lens groups deviates from the optical axis, or tilt which is a phenomenon of lens tilt occurs, problems happen that the angle of view is changed or the out-of-focus occurs, thereby adversely affecting image quality or resolution power.

In addition, in the conventional OIS technology, it is possible to implement AF or Zoom at the same time as OIS driving, but due to the space constraints of the camera module and the position of the driving part of the existing OIS technology, the magnet for OIS and the magnet for AF or Zoom are placed close to each other, thereby causing magnetic field interference, hindering proper OIS operation, and resulting in a phenomenon of decent or tilt.

In addition, the OIS technology of the prior art has a problem in that the structure is complicated and power consumption increases because a mechanical driving device is required for lens movement or module tilting.

Meanwhile, the content described in the item merely provides background information for the present disclosure and does not constitute prior art.

DETAILED DESCRIPTION OF THE INVENTION

Technical Subject

An object of the present invention is to provide a lens assembly driving apparatus and a camera module comprising the same capable of preventing friction torque generated when each lens group is moved through zooming in a camera module.

In addition, an object of the present invention is to provide a lens assembly driving apparatus and a camera module comprising the same capable of preventing the occurrence of a phenomenon such as decenter or lens tilt or the like in which the center of the lens and the center axis of the image sensor do not coincide when moving each lens group through zooming in the camera module.

In addition, an object of the present invention is to provide an ultra-slim and ultra-small lens assembly driving apparatus and a camera module comprising the same.

In addition, an object of the present invention is to provide a lens assembly driving apparatus and a camera module comprising the same which eliminates the size limitation of a lens in a lens assembly of an optical system when implementing OIS to enable to obtain a sufficient amount of light.

In addition, an object of the present invention is to provide a lens assembly driving apparatus and a camera module comprising the same capable of minimizing the occurrence of a decent or tilt phenomenon when implementing OIS and thus exhibiting the best optical properties.

In addition, an object of the present invention is to provide a lens assembly driving apparatus and a camera module comprising the same capable of preventing magnetic field interference with magnets for AF or Zoom when implementing OIS.

In addition, an object of the present invention is to provide a lens assembly driving apparatus and a camera module comprising the same capable of implementing OIS with low power consumption.

Technical Solution

A lens assembly driving apparatus according to an aspect of the present invention for achieving the above object comprises: a first driving unit disposed in a housing; a lens assembly disposed inside the housing; and a second driving unit disposed in the lens assembly and facing the first driving unit, wherein on the basis of an optical axis direction, a first length of the first driving unit is longer than or equal to a first length of the second driving unit, and on the basis of a direction perpendicular to the optical axis direction, a second length of the first driving unit is shorter than a second length of the second driving unit.

In addition, the second driving unit comprises a magnet, and one surface of the magnet and the other surface opposite to the one surface may have different polarities.

In addition, the first driving unit may comprise a coil.

In addition, the first driving unit may comprise a first yoke, and the coil may be wound around the first yoke.

In addition, the second driving unit comprises a second yoke, and the second yoke may be disposed between the lens assembly and the magnet to be in contact with at least two surfaces of the magnet.

In addition, the coil may be disposed at the center of the magnet in a direction perpendicular to the optical axis direction.

In addition, a position recognition sensor for recognizing a position of the second driving unit is comprised, wherein the position recognition sensor may be disposed above or below the first driving unit.

In addition, the position recognition sensor may be disposed at a corresponding position between the side surface and the center of the first driving unit.

In addition, the position recognition sensor comprises a plurality of position recognition sensors, and the plurality of position recognition sensors may be disposed spaced apart from one another in the optical axis direction.

A lens assembly driving apparatus according to an aspect of the present invention for achieving the above object comprises: a coil disposed in a housing; a lens assembly disposed inside the housing; and a magnet disposed in the lens assembly and facing the coil, wherein the magnet moves within a range between both ends of the coil.

In addition, a lens group disposed in the lens assembly is comprised, and a length of the coil in an optical axis direction may be longer than a length of the lens group.

A lens assembly driving apparatus according to an aspect of the present invention for achieving the above object comprises: a first driving unit disposed in a housing; a lens assembly disposed within the housing; and a second driving unit disposed on the lens assembly and facing the first driving unit, wherein the first driving unit and the second driving unit comprise a coil or a magnet, wherein the second driving part is the magnet when the first driving unit is the coil, wherein the second driving unit is the coil when the first driving unit is the magnet, wherein the first length of the coil is longer than or equal to the first length of the magnet based on the optical axis direction, and wherein a second length of the coil may be shorter than a second length of the magnet based on a direction perpendicular to the optical axis direction.

A camera module according to an aspect of the present invention for achieving the above object comprises: a housing; a lens assembly disposed inside the housing; a first driving unit disposed in the housing; and a second driving unit disposed in the lens assembly and facing the first driving unit, wherein a first length of the first driving unit is longer than or equal to a first length of the second driving unit based on an optical axis direction, and wherein a second length of the first driving unit is shorter than a second length of the second driving unit in a direction perpendicular to the optical axis direction.

A lens assembly driving apparatus according to an aspect of the present invention for achieving the above object comprises: a housing; a lens assembly disposed in the housing; a first driving unit disposed in the housing; and a second driving unit disposed in the lens assembly, wherein the lens assembly comprises: a first lens assembly disposed to be movable in an optical axis direction with respect to the housing; and a second lens assembly disposed to the first lens assembly to be movable to the first lens assembly in an optical axis direction.

In addition, a third lens group disposed on one side of the first lens assembly and coupled to the housing is comprised, and a first lens group of the first lens assembly moves in an optical axis direction with respect to the third lens group, and a second lens group of the second lens assembly moves in an optical axis direction with respect to the first lens group, so that a zooming function can be implemented.

In addition, the first driving unit comprises a first-first driving unit and a first-second driving unit disposed on the inner side surface of the housing, wherein the second driving unit may comprise a second-first driving unit disposed in the first lens assembly and facing the first-first driving unit, and a second-second driving unit disposed on the second lens assembly and facing the first-second driving unit.

In addition, the first-first driving unit and the first-second driving unit are solenoid coils, and the second-first driving unit and the second-second driving unit may be magnets.

In addition, a first yoke disposed between the second-first driving unit and the first lens assembly is comprised, and a second yoke disposed between the second-second driving unit and the second lens assembly may be comprised.

In addition, a first guide part coupled to the housing and being extended in the optical axis direction is comprised, and the first lens assembly may comprise a first groove guided by the first guide part.

In addition, the first guide part comprises a first-first guide part spaced apart in a first direction perpendicular to the optical axis direction, and a first-second guide part, and the first groove may comprise a first-first groove and a first-second groove spaced apart in a first direction perpendicular to the optical axis direction.

In addition, the second driving unit may be disposed between the first-first groove and the first-second groove.

In addition, one of the first-first groove and the first-second groove may be formed in a 'U' shape, and the other may be formed in a 'V' shape.

In addition, a second guide part disposed between the first lens assembly and the second lens assembly and guiding movement of the second lens assembly with respect to the first lens assembly may be comprised.

In addition, the second guide part may be formed in a ball shape.

In addition, the first lens assembly comprises a second groove in which one side of the second guide part is seated, and the second lens assembly may comprise a third groove in which the other side of the second guide part is seated.

In addition, the second guide part comprises: a second-first guide part spaced apart in a first direction in a direction perpendicular to the direction of the optical axis; and a second-second guide part, wherein the second groove comprises: a second-first groove spaced apart from each other in a first direction perpendicular to the optical axis direction; and a second-second home, and wherein the third groove may comprise: a third-first groove spaced apart in a first direction perpendicular to the optical axis direction; and a third-second groove.

In addition, one of the second-first groove and the second-second groove may be formed in a 'U' shape, and the other may be formed in a 'V' shape.

In addition, the third-first groove and the third-second groove may be formed in a 'V' shape.

In addition, the first lens assembly comprises a protruded part being extended in an optical axis direction, wherein the second groove may be formed on an inner side surface of the protruded part facing the third groove.

In addition, the second guide part may be overlapped with the first guide part in a second direction perpendicular to the optical axis direction.

In addition, the first lens assembly comprises a protruded part being extended in the optical axis direction, wherein the protruded part comprises a second groove formed in an inner side surface facing the second lens assembly, wherein the second lens assembly comprises a protruded portion being protruded in the direction of the protruded part and formed in a shape corresponding to the second groove, wherein the protruded portion may guide movement of the second lens assembly with respect to the first lens assembly.

A lens assembly driving apparatus according to an aspect of the present invention for achieving the above object comprises: a housing; a first lens assembly movably disposed in the housing in an optical axis direction; a first-first and a first-second driving units disposed in the housing; a second-first driving unit disposed in the first lens assembly and facing the first-first driving unit; a second lens assembly movably coupled to the first lens assembly in the optical axis direction; and a second-second driving unit disposed on the second lens assembly and facing the first-second driving unit.

A camera module according to an aspect of the present invention for achieving the above object comprises: a housing; a first lens assembly comprising a first lens group and movably disposed in the housing in an optical axis direction; a first-first and a first-second driving units disposed in the housing; a second-first driving unit disposed in the first lens assembly and facing the first-first driving unit; a second lens assembly comprising a second lens group and movably coupled to the first lens assembly in the optical axis direction; a second-second driving unit disposed in the second lens assembly and facing the first-second driving unit; a third lens group coupled to the housing, wherein the first to third lens groups are overlapped in an optical axis direction.

Advantageous Effects

Through the present embodiment, it is possible to provide a lens assembly driving apparatus and a camera module comprising the same capable of preventing friction torque generated when each lens group is moved through zooming in the camera module.

Through the present embodiment, it is possible to provide a lens assembly driving apparatus and a camera module comprising the same capable of preventing the occurrence of a phenomenon in which the center of the lens and the center axis of the image sensor do not coincide, such as lens decenter or lens tilt when moving each lens group through zooming in the camera module.

In addition, through the present embodiment, it is possible to provide an ultra-slim and ultra-small lens assembly driving apparatus and a camera module.

In addition, through the present embodiment, it is possible to provide a lens assembly driving apparatus and a camera module comprising the same which eliminates the size limitation of a lens in a lens assembly of an optical system when implementing OIS to enable to obtain a sufficient amount of light.

In addition, through the present embodiment, it is possible to provide a lens assembly driving apparatus and a camera module comprising the same capable of minimizing the occurrence of a decent or tilt phenomenon when implementing OIS and thus exhibiting the best optical properties.

In addition, through the present embodiment, it is possible to provide a lens assembly driving apparatus and a camera module comprising the same capable of preventing magnetic field interference with magnets for AF or Zoom when implementing OIS.

In addition, through the present embodiment, it is possible to provide a lens assembly driving apparatus and a camera module comprising the same capable of implementing OIS with low power consumption.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used below is defined as an optical axis direction of each lens group coupled to the lens assembly driving apparatus.

Hereinafter, the present invention will be described in more detail with reference to the accompanying drawings.

Figure 1:
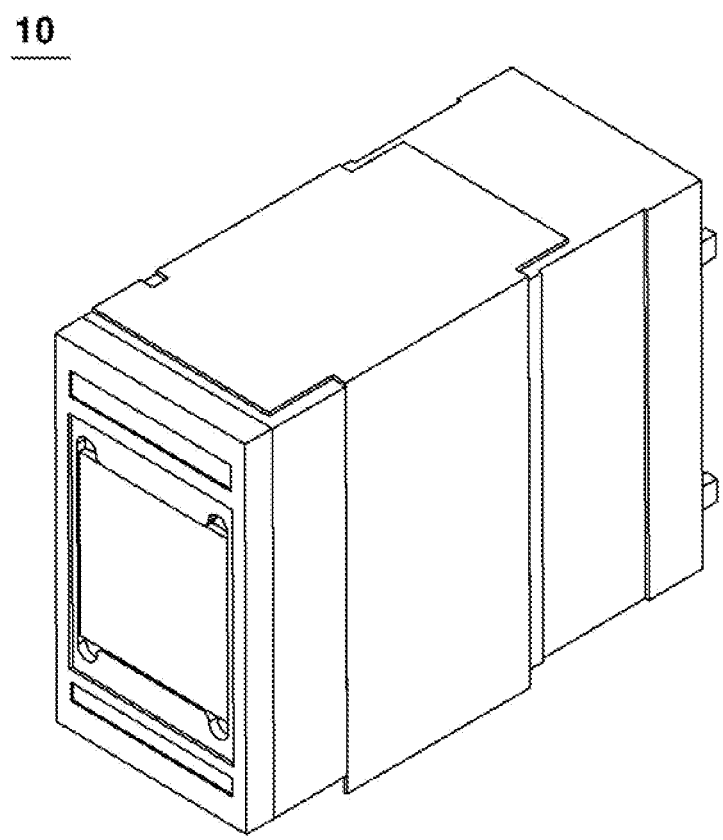
FIG. 1 is a perspective view of a camera module according to an embodiment of the present invention.
Figure 2:
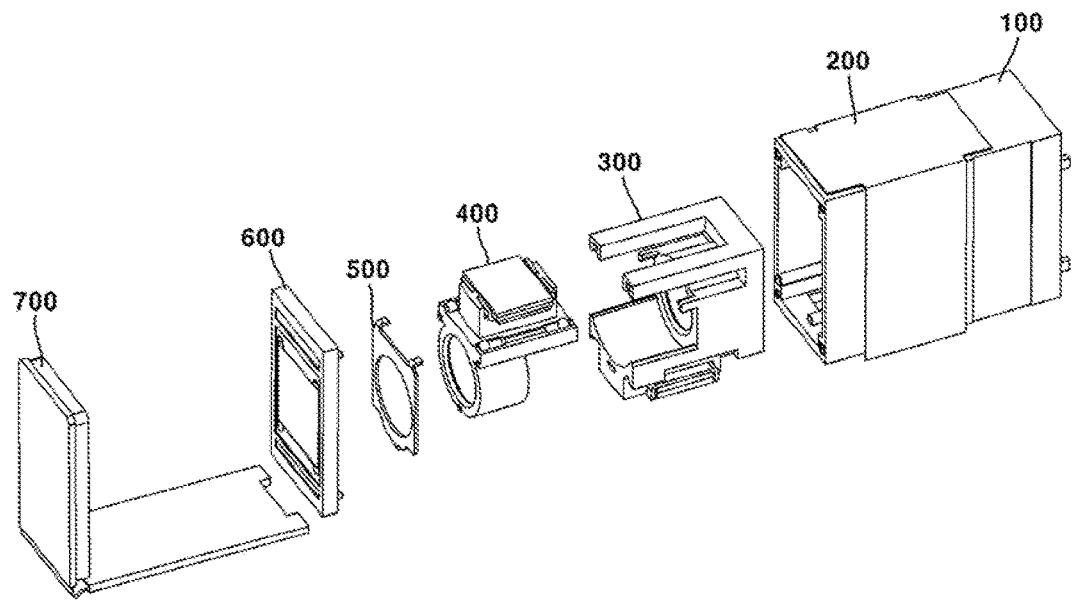
FIG. 2 is an exploded perspective view of a camera module according to an embodiment of the present invention.
Figure 3:
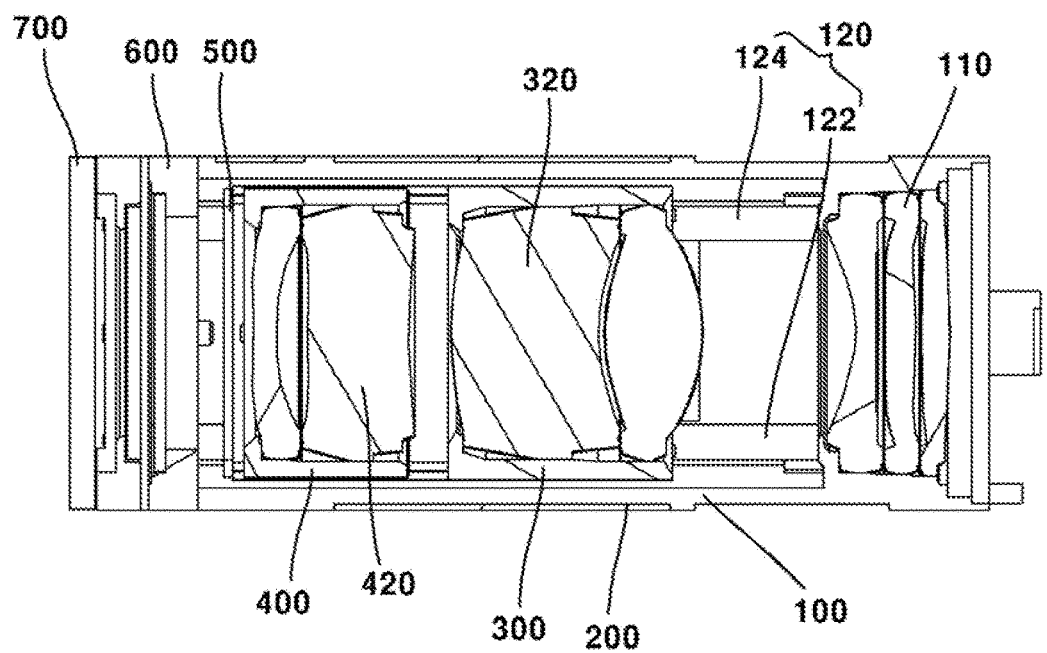
FIG. 3 is a cross-sectional view of a camera module according to an embodiment of the present invention.
Figure 4:
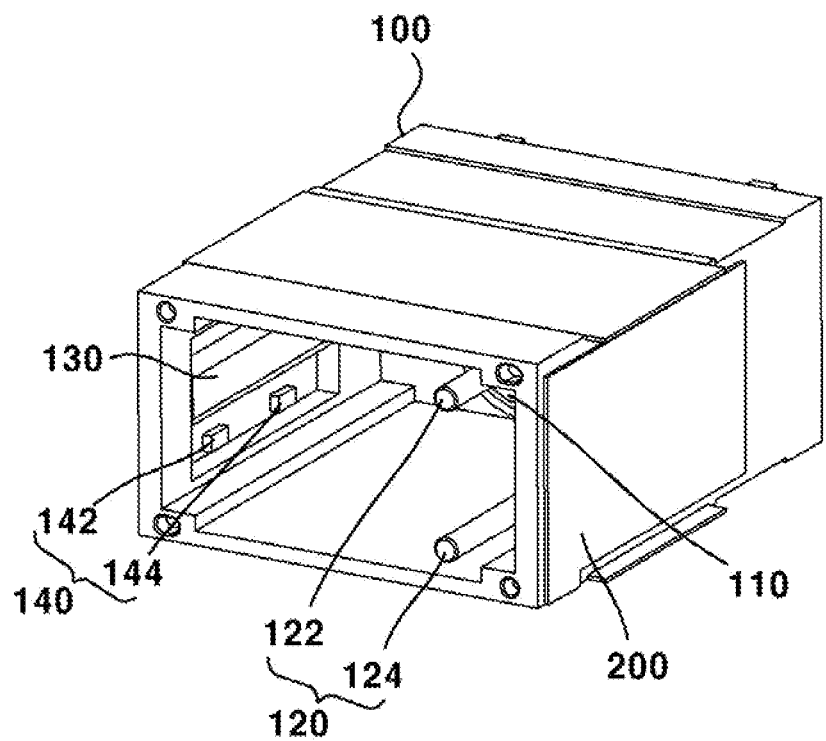
FIG. 4 is a perspective view with some components of the camera module removed according to an embodiment of the present invention.
Figure 5:
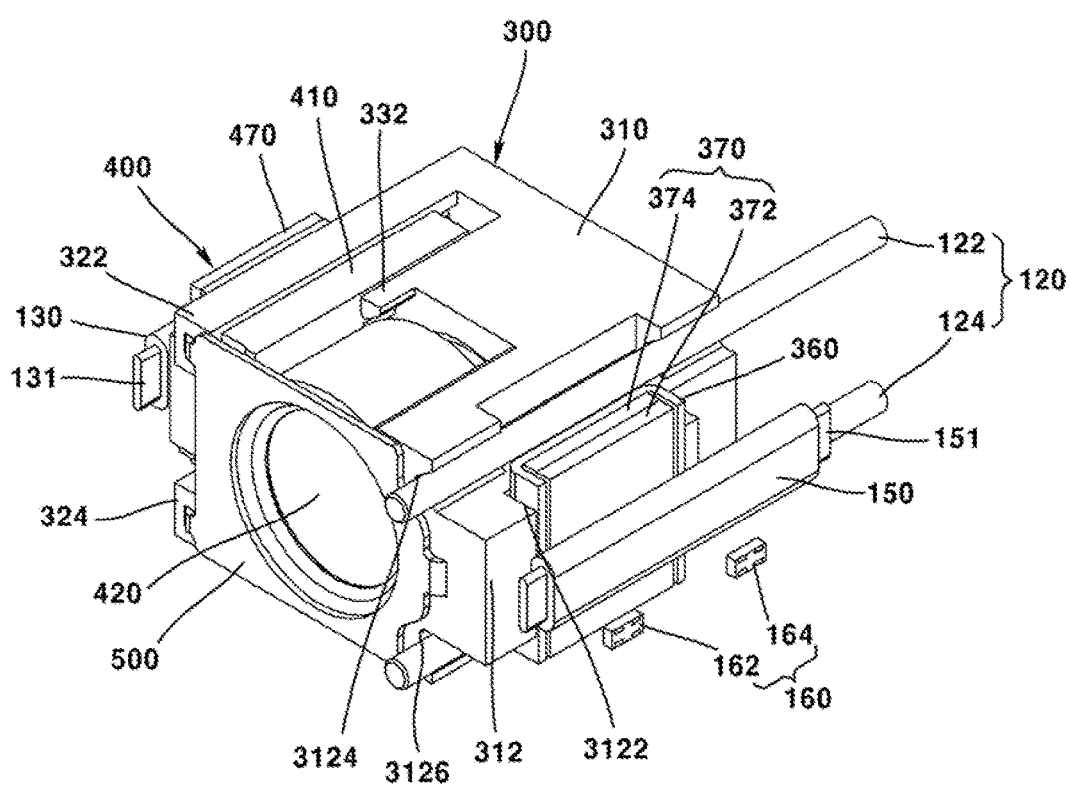
FIG. 5 is a perspective view with some components of the camera module removed according to an embodiment of the present invention.
Figure 6:
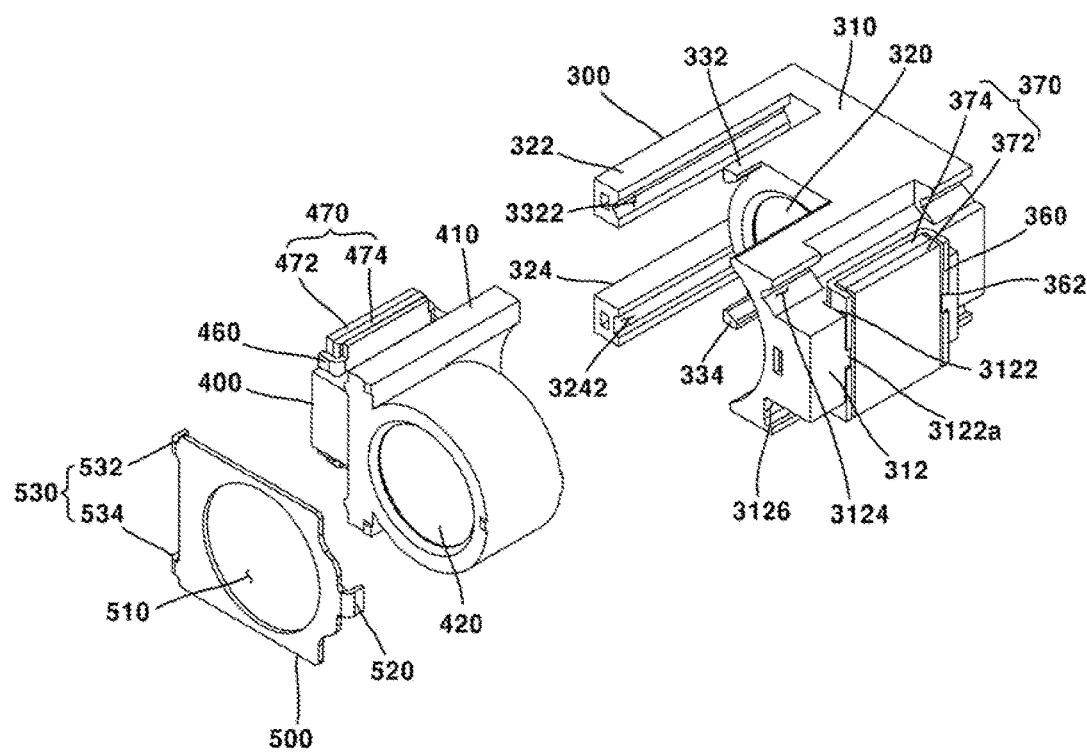
FIG. 6 is an exploded perspective view of FIG. 5.
Figure 7:
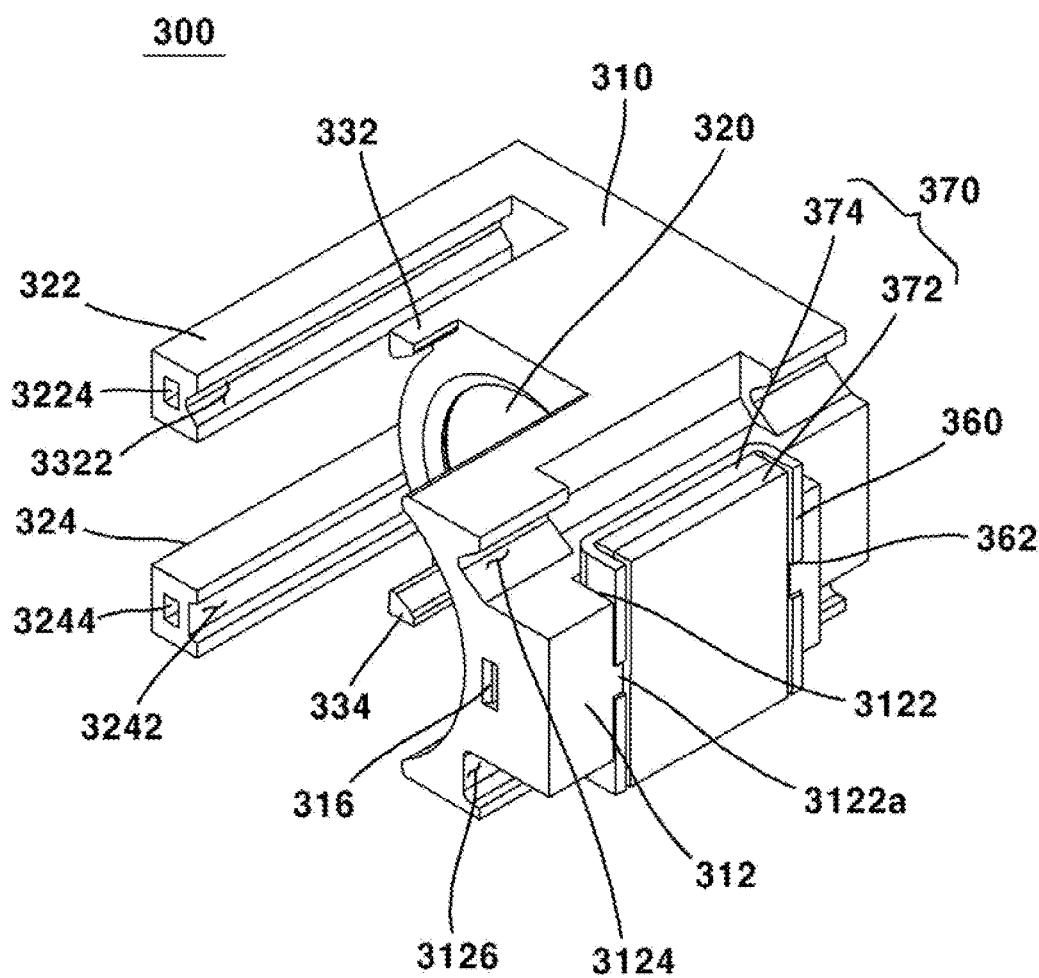
FIGS. 7 and 8 are perspective views of some configurations of FIG. 5.
Figure 8:
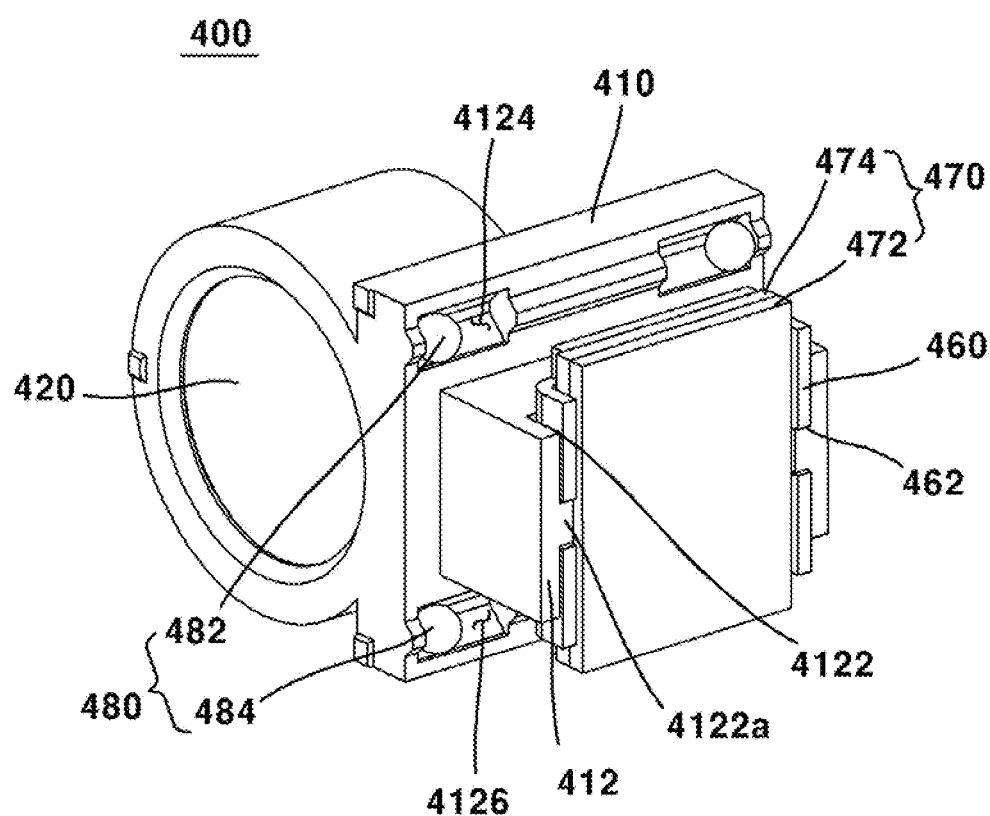
Figure 9:
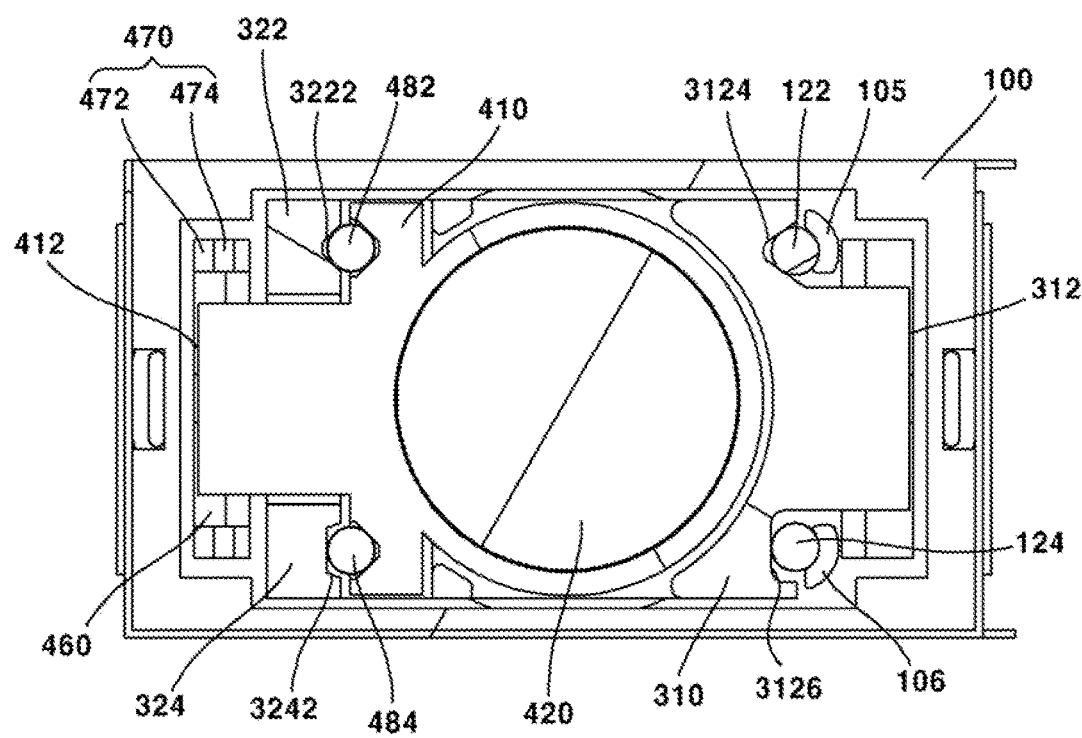
FIG. 9 is a cross-sectional view of a camera module according to an embodiment of the present invention.

FIG. 1 is a perspective view of a camera module according to an embodiment of the present invention. FIG. 2 is an exploded perspective view of a camera module according to an embodiment of the present invention. FIG. 3 is a cross-sectional view of a camera module according to an embodiment of the present invention. FIG. 4 is a perspective view with some components of the camera module removed according to an embodiment of the present invention. FIG. 5 is a perspective view with some components of the camera module removed according to an embodiment of the present invention. FIG. 6 is an exploded perspective view of FIG. 5. FIGS. 7 and 8 are perspective views of some configurations of FIG. 5. FIG. 9 is a cross-sectional view of a camera module according to an embodiment of the present invention.

Referring to FIGS. 1 to 8, the camera module 10 according to an embodiment of the present invention may comprise: a housing assembly 100; first driving units 130 and 150; a substrate 200; a first lens assembly 300; a second lens assembly 400; second driving units 370 and 470, and a stopper 500; a cover assembly 600; and a sensor assembly 700, but does not exclude any additional configuration other than that.

The camera module 10 may comprise a housing assembly 100. The housing assembly 100 may form the external appearance of the camera module 10. The housing assembly 100 may be formed in a hexahedral shape in which the inside is exposed. A substrate 200, a first lens assembly 300, a second lens assembly 400, a stopper 500, a cover assembly 600, and a sensor assembly 700 may be disposed in the housing assembly 100. A third lens group 110 may be disposed in the housing assembly 100. First driving units 130 and 150 may be disposed in the housing assembly 100. A guide part 120 may be disposed in the housing assembly 100. Position recognition sensors 140 and 160 may be disposed in the housing assembly 100. The housing assembly 100 may be referred to as 'housing'.

The camera module 10 may comprise a third lens group 110. The third lens group 110 may be disposed on the housing assembly 100. The third lens group 110 may be fixed to the housing assembly 100. The third lens group 110 may be fixed to the rear surface of the housing assembly 100. The third lens group 110 may be disposed on one side of the first lens group 320. The third lens group 110 may comprise at least one lens.

The camera module 10 may comprise first driving units 130 and 150. The first driving units 130 and 150 may be disposed in the housing assembly 100. The first driving units 130 and 150 may be disposed on an inner side surface of the housing assembly 100. The first driving units 130 and 150 may face the second driving units 370 and 470. The first driving units 130 and 150 may comprise a coil or a magnet. When the second driving units 370 and 470 are magnets, the first driving units 130 and 150 may be coils. When the second driving units 370 and 470 are coils, the first driving units 130 and 150 may be magnets. The first driving units 130 and 150 may move the first lens assembly 300 and the second lens assembly 400 in an optical axis direction through electromagnetic interaction with the second driving units 370 and 470. Through this, a zooming function can be implemented.

The first length in the optical axis direction of the first driving units 130 and 150 may be longer than or equal to the first length in the optical axis direction of the second driving units 370 and 470. A second length in a direction perpendicular to the optical axis of the first driving units 130 and 150 may be shorter than a second length in a direction perpendicular to the optical axis direction of the second driving units 370 and 470. In a direction perpendicular to the optical axis direction, the first driving units 130 and 150 may be disposed at the center of the second driving units 370 and 470. In a direction perpendicular to the optical axis direction, the first driving units 130 and 150 may be overlapped with central regions of the second driving units 370 and 470. In the optical axis direction, the second driving units 370 and 470 may move within the range of both ends of the first driving unit 130 and 150, for example, within the range of the first length. The first driving units 130 and 150 may be formed to be longer than the length in the optical axis direction of one among the first to third lens groups 320, 420 and 110 based on the optical axis direction. For example, the first length of the first driving unit 130 and 150 in the optical axis direction may be longer than a first length of one among the first to third lens groups 320, 420 and 110 in the optical axis direction.

The first driving units 130 and 150 may comprise a first-first driving unit 150 and a first-second driving unit 130. The first-first driving unit 150 and the first-second driving unit 130 may be spaced apart from each other. The first-first driving unit 130 is disposed on an inner side surface of the housing assembly 100, and the first-second driving unit 150 may be disposed on a surface of the inner side surface of the housing assembly 100 that faces the surface on which the first-first driving unit 130 is disposed.

The first-first driving unit 150 may be disposed on an inner side surface of the housing assembly 100. The first-first driving unit 150 may be a coil. The first-first driving unit 150 may surround the first-first yoke 151 being extended in an optical axis direction. Through this, the electromagnetic force of the first-first driving unit 150 may be enhanced. The first-first driving unit 150 may face the second-first driving unit 370. The first-first driving unit 150 may move the first and/or second lens assemblies 300 and 400 in the optical axis direction through electromagnetic interaction with the second-first driving unit 370. In an embodiment of the present invention, it is described as an example that the first-first driving unit 150 moves the first and second lens assemblies 300 and 400 in the optical axis direction through electromagnetic interaction with the second-first driving unit 370, but is not limited thereto.

The first-second driving unit 130 may be disposed on an inner side surface of the housing assembly 100. The first-second driving unit 130 may be a coil. The first-second driving unit 130 may surround the first-second yoke 131 being extended in the optical axis direction. Through this, the electromagnetic force of the first-second driving unit 130 may be enhanced. The first-second driving unit 130 may face the second-second driving unit 470. The first-second driving unit 130 may move the first and/or second lens assemblies 300 and 400 in the optical axis direction through electromagnetic interaction with the second-second driving unit 470. In one embodiment of the present invention, it is described as an example that the first-second driving unit 130 moves the second lens assembly 400 in the optical axis direction through electromagnetic interaction with the second-second driving unit 470 with respect to the first lens assembly 300, but is not limited thereto.

The camera module 10 may comprise a guide part 120. The guide part 120 may be disposed in the housing assembly 100. The guide part 120 may be extended in the optical axis direction. The guide part 120 may be fixed to the housing assembly 100. The guide part 120 may be fixed to fixing parts 105 and 106 of the housing assembly 100. The guide part 120 may be in contact with the first lens assembly 300. The guide part 120 may be disposed in a first-second side surface groove 3124 and a first-third side surface groove 3126 of a first side surface 312 of a first body 310 of the first lens assembly 300. Through this, the movement of the first lens assembly 300 in the optical axis direction may be guided.

The guide part 120 may comprise a first guide part 122 and a second guide part 124. The first guide part 122 and the second guide part 124 may be extended in an optical axis direction, respectively. The first guide part 122 and the second guide part 124 may be disposed parallel to each other.

The first guide part 122 may be fixed to the housing assembly 100. The first guide part 122 may be fixed to the first fixing part 105 of the housing assembly 100. The first guide part 122 may be disposed in the first-second side groove 3124. The first guide part 122 may be in contact with the inner side surface of the first-second side groove 3124. The first guide part 122 may be disposed above the second guide part 124.

The second guide part 124 may be fixed to the housing assembly 100. The second guide part 124 may be fixed to the second fixing part 106 of the housing assembly 100. The second guide part 124 may be disposed in the first-third side surface groove 3126. The second guide part 124 may contact the inner side surface of the first-third side surface groove 3126. The second guide part 124 may be disposed below the first guide part 122.

In an embodiment of the present invention, it is described as an example that the first and second guide parts 122 and 124 are formed in a rod shape being extended in the optical axis direction, but is not limited thereto, and cross-sectional shapes of the first and second guide parts 122 and 124 may be variously changed.

The camera module 10 may comprise position recognition sensors 140 and 160. The position recognition sensors 140 and 160 may be disposed in the housing assembly 100. The position recognition sensors 140 and 160 may be disposed on the inner side surface of the housing assembly 100. The position recognition sensors 140 and 160 may face the second driving units 370 and 470. The position recognition sensors 140 and 160 may recognize the positions of the second driving units 370 and 470 moving through electromagnetic interaction with the first driving units 130 and 150. The position recognition sensors 140 and 160 may comprise a Hall sensor. The position recognition sensors 140 and 160 may be disposed above or below the first driving unit 130 and 150. The position recognition sensors 140 and 160 may be disposed at corresponding positions between the side surface and the center of the first driving units 130 and 150. For example, the position recognition sensors 140 and 160 may be overlapped with a region between the side surface and the center of the first driving unit 130 and 150 in a direction perpendicular to the optical axis direction.

The position recognition sensors 140 and 160 may comprise a plurality of position recognition sensors 140 and 160. The position recognition sensors 140 and 160 may comprise a first position recognition sensor 160 and a second position recognition sensor 140.

The first position recognition sensor 160 may be disposed on the inner side surface of the housing assembly 100. The first position recognition sensor 160 may face the second-first driving unit 370. The first position recognition sensor 160 may be disposed above or below the first-first driving unit 150. The first position recognition sensor 160 may be disposed below the first-first driving unit 150.

The first position recognition sensor 160 may comprise a first-first position recognition sensor 162 and a first-second position recognition sensor 164. The first-first position recognition sensor 162 and the first-second position recognition sensor 164 may be disposed spaced apart from each other in the optical axis direction. An imaginary line connecting the first-first position recognition sensor 162 and the first-second position recognition sensor 164 may be parallel to the first-first driving unit 150. The first-first position recognition sensor 162 may be disposed at a corresponding position between one side of the first-first driving unit 150 and the central region. For example, the first-first position recognition sensor 162 may be overlapped with an area between one side surface of the first-first driving unit 150 and a central region in a direction perpendicular to the optical axis direction. The first-second position recognition sensor 164 may be disposed at a corresponding position to the other side surface and the central region of the first-first driving unit 150. For example, the first-second position recognition sensor 164 may be overlapped with a region between the center region and the other side surface of the first-first driving unit 150 in a direction perpendicular to the optical axis direction.

The second position recognition sensor 140 may be disposed on a surface among the housing assembly 100 facing the surface on which the first position recognition sensor 160 is disposed. The second position recognition sensor 140 may face the second-second driving unit 470. The second position recognition sensor 140 may be disposed above or below the first-second driving unit 130. The second position recognition sensor 140 may be disposed below the first-second driving unit 130.

The second position recognition sensor 140 may comprise a second-first position recognition sensor 142 and a second-second position recognition sensor 144. The second-first position recognition sensor 142 and the second-second position recognition sensor 144 may be disposed spaced apart from each other in the optical axis direction. An imaginary line connecting the second-first position recognition sensor 142 and the second-second position recognition sensor 144 may be parallel to the first-second driving unit 130. The second-first position recognition sensor 142 may be disposed at a corresponding position between one side surface of the first-second driving unit 130 and the central region. For example, the second-first position recognition sensor 142 may be overlapped with an area between one side surface of the first-second driving unit 130 and the central region in a direction perpendicular to the optical axis direction. The second-second position recognition sensor 144 may be disposed at a corresponding position to the center region and the other side surface of the first-second driving unit 130. For example, the second-second position recognition sensor 144 may be overlapped with an area between the center region and the other side surface of the first-second driving unit 130 in a direction perpendicular to the optical axis direction.

In one embodiment of the present invention, the second driving units 370 and 470 moves within a first length in the optical axis direction of the first driving units 130 and 150, and since the position is sensed through two position recognition sensor pairs 142 and 144, and 162 and 164, per corresponding second driving units 370 and 470, efficiency can be enhanced.

The camera module 10 may comprise a substrate 200. The substrate 200 may be disposed in the housing assembly 100. The substrate 200 may surround the housing assembly 100. The substrate 200 may supply power or current to components disposed inside the housing assembly 100. The substrate 200 may comprise a flexible substrate. The substrate 200 may comprise a flexible printed circuit board (FPCB).

The camera module 10 may comprise a first lens assembly 300. The first lens assembly 300 may be disposed in the housing assembly 100. The first lens assembly 300 may be disposed inside the housing assembly 100. The first lens assembly 300 may be movably disposed inside the housing assembly 100 in the optical axis direction. The first lens assembly 300 may be overlapped with the third lens group 110 in the optical axis direction. A second lens assembly 400 may be disposed in the first lens assembly 300. The first lens assembly 300 may move in the optical axis direction through electromagnetic interaction between the first-first driving unit 150 and the second-first driving unit 370. Through this, the distance from the first lens assembly 300 together with the second lens assembly 400 to the third lens group 110 may be adjusted. Through this, a zooming function of the camera module 10 may be implemented. The movement of the first lens assembly 300 in the optical axis direction may be guided by the guide part 120.

A second-first yoke 360 and a second-first driving unit 370 may be disposed in the first lens assembly 300. The second lens assembly 400 may be disposed in the first lens assembly 300. A stopper 500 may be coupled to the first lens assembly 300. The first lens assembly 300 may comprise a first body 310 and a first lens group 320.

The first lens group 320 may be disposed in the first body 310. The first lens group 320 may be overlapped with the third lens group 110 and the second lens group 420 in the optical axis direction. The first lens group 320 may comprise at least one lens.

The first body 310 may be disposed inside the housing assembly 100. A second body 410 may be disposed in the first body 310. A first lens group 320 may be disposed in a central region of the first body 310. The first body 310 may comprise a first side surface 312, first protruded parts 322 and 324, and second protruded parts 332 and 334.

The first side surface 312 may face an inner side surface of the housing assembly 100. The first side surface 312 may face the first-first driving unit 150 and the first position recognition sensor 160. The first side surface 312 may comprise a first-first side surface groove 3122, a first-second side surface groove 3124, and a first-third side surface groove 3126.

The first-first side surface groove 3122 may be disposed more outwardly than the first-second side surface groove 3124 and the first-third side surface groove 3126. A second-first yoke 360 and a second-first driving unit 370 may be disposed in the first-first side surface groove 3122. A first guide protrusion 3122a may be formed in the first-second side surface groove 3122. The first guide protrusion 3122a may be inserted into the first yoke groove 362 of the second-first yoke 360. Through this, it is possible to guide the position of the second-first yoke 360 with respect to the first-first side surface groove 3122.

A guide part 120 may be disposed in the first-second side surface groove 3124 and the first-third side surface groove 3126. A first guide part 122 may be disposed in the first-second side surface groove 3124. A second guide part 124 may be disposed in the first-third side surface groove 3126. One of the inner side surface of the first-second side surface groove 3124 and the inner side surface of the first-third side surface groove 3126 is formed in a 'U' shape, and the other one may be formed in a 'V' shape. That is, the movement of the first lens assembly 300 may be efficiently guided by using different number of contact points with the guide part 120.

The first protruded parts 322 and 324 and the second protruded parts 332 and 334 may be extended in the optical axis direction. The first protruded parts 322 and 324 may be disposed more outwardly than the second protruded parts 332 and 334. The length in the optical axis direction of the first protruded parts 322 and 324 may be longer than the length in the optical axis direction of the second protruded parts 332 and 334. The second body 410 of the second lens assembly 400 may be disposed between the first protruded parts 322 and 324 and the second protruded parts 332 and 334.

The first protruded parts 322 and 324 may comprise a first-first protruded part 322 and a first-second protruded part 324. The first-first protruded part 322 and the first-second protruded part 324 may be spaced apart from each other in a direction perpendicular to the optical axis. The first-first protruded part 322 may comprise a first-first protruded groove 3322, and the first-second protruded part 324 may comprise a first-second protruded groove 3242. A guide ball 480 may be disposed in the first-first protruded groove 3322 and the first-second protruded groove 3242. A first guide ball 482 may be disposed in the first-first protruded groove 3322, and a second guide ball 484 may be disposed in the first-second protruded groove 3242. One of the inner side surface of the first-first protruded groove 3322 and the inner side surface of the first-second protruded groove 3242 is formed in a 'U' shape, and the other may be formed in a 'V' shape. Through this, the movement of the second lens assembly 400 with respect to the first lens assembly 300 may be efficiently guided.

The first protruded parts 322 and 324 may comprise coupling grooves 3224 and 3244 formed at the ends. Specifically, a first coupling groove 3224 may be formed at an end portion of the first-first protruded part 322, and a second coupling groove 3244 may be formed at an end portion of the first-second protruded part 324. In the first coupling groove 3224 and the second coupling groove 3244, the coupling protrusions 520 and 530 of the stopper 500 may be inserted together with the third coupling groove 316 formed on the front surface of the first body 310. For example, the first coupling protrusion 520 is snap-fit coupled to the third coupling groove 316, and the second-first coupling protrusion 532 is snap-fit coupled to the first coupling groove 3224, and, a second-second coupling protrusion 534 may be snap-fit coupled to the second coupling groove 3244 to couple the stopper 500 to the first lens assembly 300.

The camera module 10 may comprise a second lens assembly 400. The second lens assembly 400 may be disposed in the housing assembly 100. The second lens assembly 400 may be disposed inside the housing assembly 100. The second lens assembly 400 may be overlapped with the third lens group 110 and the first lens assembly 300 in the optical axis direction. The second lens assembly 400 may be disposed in the first lens assembly 300. The second lens assembly 400 may be disposed in the first lens assembly 300 to be movable in the optical axis direction. The second lens assembly 400 may move together with the first lens assembly 300 in the optical axis direction through electromagnetic interaction between the first-first driving unit 150 and the second-first driving unit 370. Through this, the distance in the optical axis direction of the second lens assembly 400 to the third lens group 110 may be adjusted. The second lens assembly 400 may move in the optical axis direction with respect to the first lens assembly 300 through electromagnetic interaction between the first-second driving unit 130 and the second-second driving unit 470. Through this, the distance in the optical axis direction of the second lens assembly 400 to the first lens assembly 300 may be adjusted. That is, the zooming function of the camera module 10 may be implemented. The movement of the second lens assembly 400 in the optical axis direction may be guided through the guide ball 480.

A second-second yoke 460 and a second-second driving unit 470 may be disposed in the second lens assembly 400. The second lens assembly 400 may comprise a second body 410 and a second lens group 420.

The second lens group 420 may be disposed in the second body 410. The second lens group 420 may be overlapped with the third lens group 110 and the first lens group 320 in the optical axis direction. The second lens group 420 may comprise at least one lens.

The second body 410 may be disposed inside the housing assembly 100. The second body 410 may be disposed in the first body 310. The second body 410 may be disposed between the first protruded parts 322 and 324 and the second protruded parts 332 and 334 of the first body 310. A second lens group 420 may be disposed in the central region of the second body 410. The second body 410 may comprise a second side surface 412.

The second side surface 412 may face an inner side surface of the housing assembly 100. The second side surface 412 may face a surface facing the first side surface 312 among the inner side surfaces of the housing assembly 100. The second side surface 412 may face the first-second driving unit 130 and the second position recognition sensor 140. The second side surface 412 may comprise a second-first side surface groove 4122, a second-second side surface groove 4124, and a second-third side surface groove 4126.

The second-first side surface groove 4122 may be disposed more outwardly than the second-second side surface groove 4124 and the second-third side surface groove 4126. A second-second yoke 460 and a second-second driving unit 470 may be disposed in the second-first side surface groove 4122. A second guide protrusion 4122a may be formed in the second-first side surface groove 4122. The second guide protrusion 4122a may be inserted into the second yoke groove 462 of the second-second yoke 460. Through this, it is possible to guide the position of the second-second yoke 460 with respect to the second-first side surface groove 4122.

The second-second side surface groove 4124 may face the first-first protruded groove 3322. The second-third side surface groove 4126 may face the first-second protruded groove 3342. A guide ball 480 may be disposed in the second-second side surface groove 4124 and the second-third side surface groove 4126. A first guide ball 482 may be disposed in the second-second side surface groove 4124. A second guide ball 484 may be disposed in the second-third side surface groove 4126. The inner side surface of the second-second side surface groove 2124 and the inner side surface of the second-third side surface groove 4126 may be formed in a 'V' shape. Through this, the two-point contact with the guide ball 480 can be maintained. Unlike this, one of the inner side surface of the second-second side surface groove 2124 and the inner side surface of the second-third side surface groove 4126 is formed in a 'U' shape, and the other may be formed in a 'V' shape.

The second-second side surface groove 4124 may comprise a plurality of second-second side surface grooves 4124. A guide protrusion (not shown) being protruded toward the first lens assembly 300 may be comprised between the plurality of second-second side surface grooves 4124. The guide protrusion may be inserted into the first-first protruded groove 3322 of the first lens assembly 300.

The second-third side surface groove 4126 may comprise a plurality of second-third side surface groove 4126. A guide protrusion (not shown) being protruded in the direction of the first lens assembly 300 may be comprised between the plurality of second-third side surface grooves 4126. The guide protrusion may be inserted into the first-second protruded groove 3242 of the first lens assembly 300.

Through this, even in the absence of the guide ball 480, the movement of the second lens assembly 400 in the optical axis direction with respect to the first lens assembly 300 may be guided.

The camera module 10 may comprise a guide ball 480. The guide ball 480 may guide movement of the second lens assembly 400 in the optical axis direction with respect to the first lens assembly 300. The guide ball 480 may comprise a first guide ball 482 and a second guide ball 484. The first guide ball 482 may be disposed between the second-second side surface groove 4124 and the first-first protruded groove 3322. The first guide ball 482 may comprise a plurality of first guide balls disposed spaced apart from each other in the optical axis direction. The second guide ball 484 may be disposed between the second-third side surface groove 4126 and the first-second protruded groove 3342. The second guide ball 484 may comprise a plurality of second guide balls disposed spaced apart from each other in the optical axis direction.

The camera module 10 may comprise second driving units 370 and 470. The second driving units 370 and 470 may be disposed in the lens assemblies 300 and 400. The second driving units 370 and 470 may be disposed in the first side surface 312 and the second side surface 412 of the lens assemblies 300 and 400. The second driving units 370 and 470 may face the first driving units 130 and 150. The second driving units 370 and 470 may comprise a coil or a magnet. When the first driving units 130 and 150 are magnets, the second driving units 370 and 470 may be coils. When the first driving units 130 and 150 are coils, the second driving units 370 and 470 may be magnets. The second driving units 370 and 470 may move the first lens assembly 300 and the second lens assembly 400 in the optical axis direction through electromagnetic interaction with the first driving units 130 and 150. Through this, a zooming function can be implemented.

The first length in the optical axis direction of the second driving units 370 and 470 may be shorter than or equal to the first length in the optical axis direction of the first driving units 130 and 150. A second length in a direction perpendicular to the optical axis direction of the second driving units 370 and 470 may be longer than a second length in a direction perpendicular to the optical axis direction of the first driving units 130 and 150. In a direction perpendicular to the optical axis direction, the first driving units 130 and 150 may be disposed at corresponding positions to the central regions of the second driving units 370 and 470. For example, in a direction perpendicular to the optical axis direction, the central region of the second driving units 370 and 470 may be overlapped with the first driving units 130 and 150. In the optical axis direction, the second driving units 370 and 470 may move within the range of both ends of the first driving unit 130 and 150, for example, within the range of the first length. The second driving units 370 and 470 may face the position recognition sensors 140 and 160. Through this, the positions of the first lens assembly 300 and the second lens assembly 400 may be recognized.

The second driving units 370 and 470 may comprise a second-first driving unit 370 and a second-second driving unit 470. The second-first driving unit 370 and the second-second driving unit 470 may be spaced apart from each other. The second-first driving unit 370 may be disposed in the first lens assembly 300, and the second-second driving unit 470 may be disposed in the second lens assembly 400.

The second-first driving unit 370 may be disposed in the first side surface 312 of the first lens assembly 300. The second-first driving unit 370 may be disposed in the first-first side surface groove 3122. A second-first yoke 360 may be disposed between the second-first driving unit 370 and the first-first side surface groove 3122. At least two surfaces of the second-first driving unit 370 may be surrounded by the second-first yoke 360. Through this, it is possible to reduce the leakage of electromagnetic force. The second-first driving unit 370 may face the first-first driving unit 150. The second-first driving unit 370 may move the first and/or second lens assemblies 300 and 400 in the optical axis direction through electromagnetic interaction with the first-first driving unit 150. In one embodiment of the present invention, it is described as an example that the second-first driving unit 370 moves the first and second lens assemblies 300 and 400 in the optical axis direction through electromagnetic interaction with the first-first driving unit 150, but is not limited thereto.

The second-first driving unit 370 may face the first position recognition sensor 160. The second-first driving unit 370 may face the first-first position recognition sensor 162 and the first-second position recognition sensor 164. One surface of the second-first driving unit 370 may be magnetized to a first polarity 372, and the other surface may be magnetized to a second polarity 374. In this case, the first polarity 372 may face the first position recognition sensor 160, and the second polarity 374 may be in contact with the second-first yoke 360.

The second-second driving unit 470 may be disposed on the second side surface 412 of the second lens assembly 400. The second-second driving unit 470 may be disposed in the second-first side surface groove 4122. A second-second yoke 460 may be disposed between the second-second driving unit 470 and the second-first side surface groove 4122. At least two surfaces of the second-second driving unit 470 may be surrounded by the second-second yoke 470. Through this, it is possible to reduce the leakage of electromagnetic force. The second-second driving unit 470 may face the first-second driving unit 130. The second-second driving unit 470 may move the first and/or second lens assemblies 300 and 400 in the optical axis direction through electromagnetic interaction with the first-second driving unit 130. In one embodiment of the present invention, it is described as an example that the second-second driving unit 470 moves the second lens assembly 400 in the optical axis direction with respect to the first lens assembly 300 through electromagnetic interaction with the first-second driving unit 130, but is not limited thereto.

The second-second driving unit 470 may face the second position recognition sensor 140. The second-second driving unit 470 may face the second-first position recognition sensor 142 and the second-second position recognition sensor 144. One surface of the second-second driving unit 470 may be magnetized to a first polarity 472, and the other surface may be magnetized to a second polarity 474. In this case, the first polarity 472 may face the second position recognition sensor 140, and the second polarity 474 may be in contact with the second-second yoke 460.

The camera module 10 may comprise a stopper 500. The stopper 500 may be disposed in the housing assembly 100. The stopper 500 may be disposed in the housing assembly 100. The stopper 500 may be coupled to the first lens assembly 300. Through this, the stopper 500 may limit the moving distance of the second lens assembly 400 moving with respect to the first lens assembly 300. The stopper 500 may comprise an opening 510, a first coupling protrusion 520, and a second coupling protrusion 530.

The opening 510 may be formed in a central region of the stopper 500. The opening 510 may be overlapped with the first to third lens groups 320, 420, and 110 in the optical axis direction. A light transmitting part (not shown) made of a light transmissive material may be disposed in the opening 510.

The first coupling protrusion 520 may be protruded rearward from one side of the stopper 500. The first coupling protrusion 520 may be inserted into and coupled to the third coupling groove 316 of the first lens assembly 300. For example, the first coupling protrusion 520 may be snap-fit coupled to the third coupling groove 316 of the first lens assembly 300.

The second coupling protrusion 530 may be protruded rearward from the other side of the stopper 500. The second coupling protrusion 530 may comprise a second-first coupling protrusion 532 and a second-second coupling protrusion 534. The second-first coupling protrusion 532 may be inserted into and coupled to the first coupling groove 3224 of the first lens assembly 300. For example, the second-first coupling protrusion 532 may be snap-fit coupled to the first coupling groove 3224 of the first lens assembly 300. The second-second coupling protrusion 534 may be inserted into and coupled to the second coupling groove 3244 of the first lens assembly 300. For example, the second-second coupling protrusion 534 may be snap-fitted to the second coupling groove 3244 of the first lens assembly 300.

The camera module 10 may comprise a cover assembly 600. The cover assembly 600 may be coupled to one side of the housing assembly 100. The first lens assembly 300, the second lens assembly 400, and the stopper 500 may be disposed in the inner space of the cover assembly 600 and the housing assembly 100. The cover assembly 600 may comprise an opening (not shown) formed in the central region. The opening of the cover assembly 600 may be overlapped with the first to third lens groups 320, 420, and 110, and the opening 510 of the stopper 500 in the optical axis direction. A light transmitting part (not shown) made of a light transmissive material may be disposed in the opening of the cover assembly 600.

The camera module 10 may comprise a sensor assembly 700. The sensor assembly 700 may be coupled to the housing assembly 100. An image sensor may be disposed in the sensor assembly 700. The image sensor of the sensor assembly 700 may receive the light passing through the first to third lens groups 320, 420, and 110 and convert it into an image.

Figure 10:
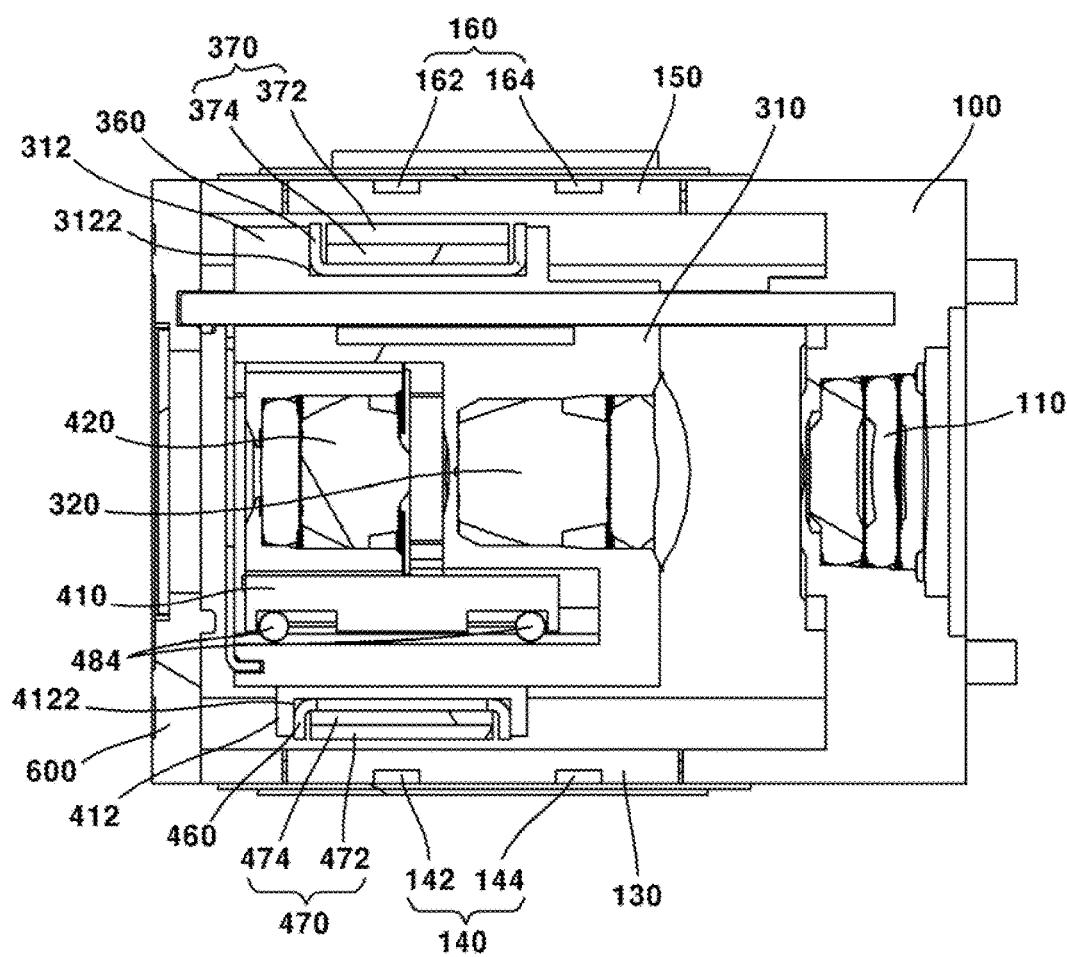
FIGS. 10 and 11 are operation diagrams of some configurations of a camera module according to an embodiment of the present invention.
Figure 11:
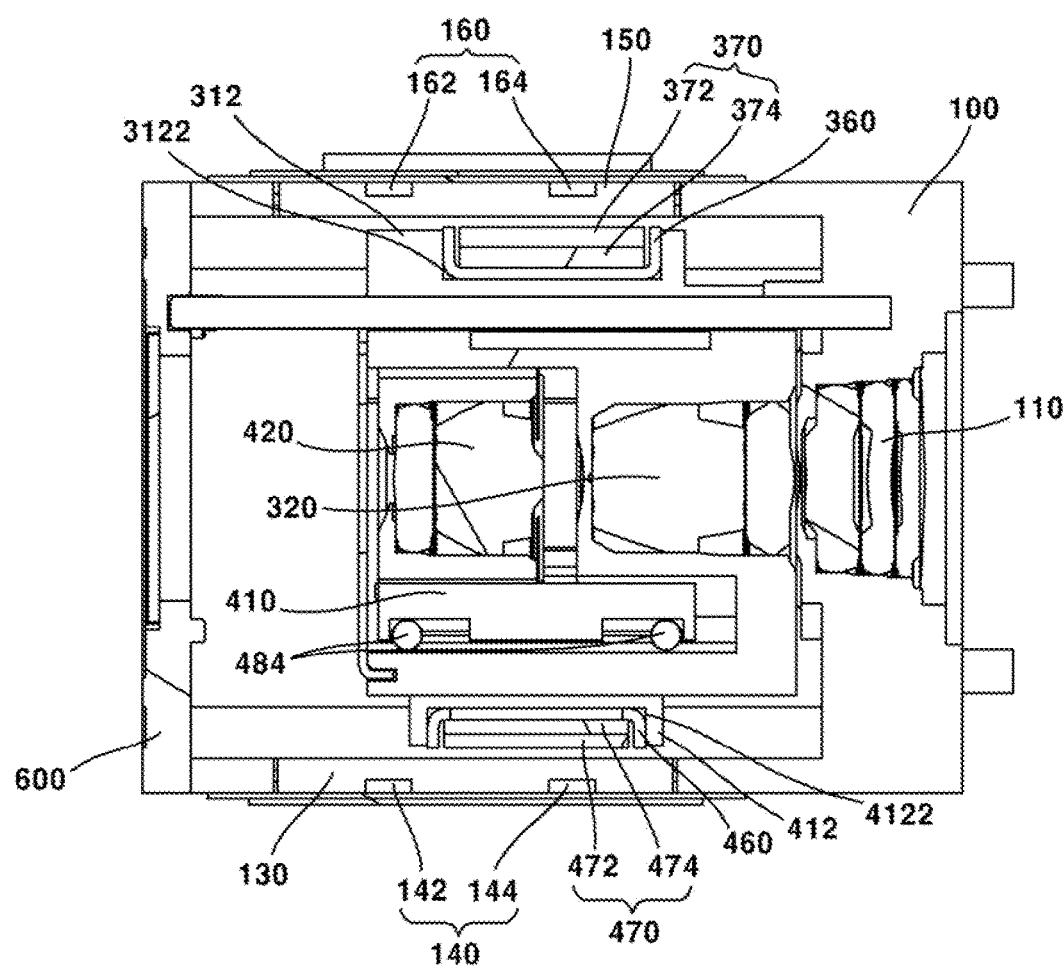

FIGS. 10 and 11 are operation diagrams of some configurations of a camera module according to an embodiment of the present invention.

Referring to FIGS. 10 and 11, it can be seen that the first lens assembly 300 and the second lens assembly 400 move with respect to the third lens group 110. Specifically, the distance from the first lens group 320 and the second lens group 420 to the third lens group 110 in the optical axis direction can be adjusted. Through this, a zooming function of the camera module 10 may be implemented.

Figure 12:
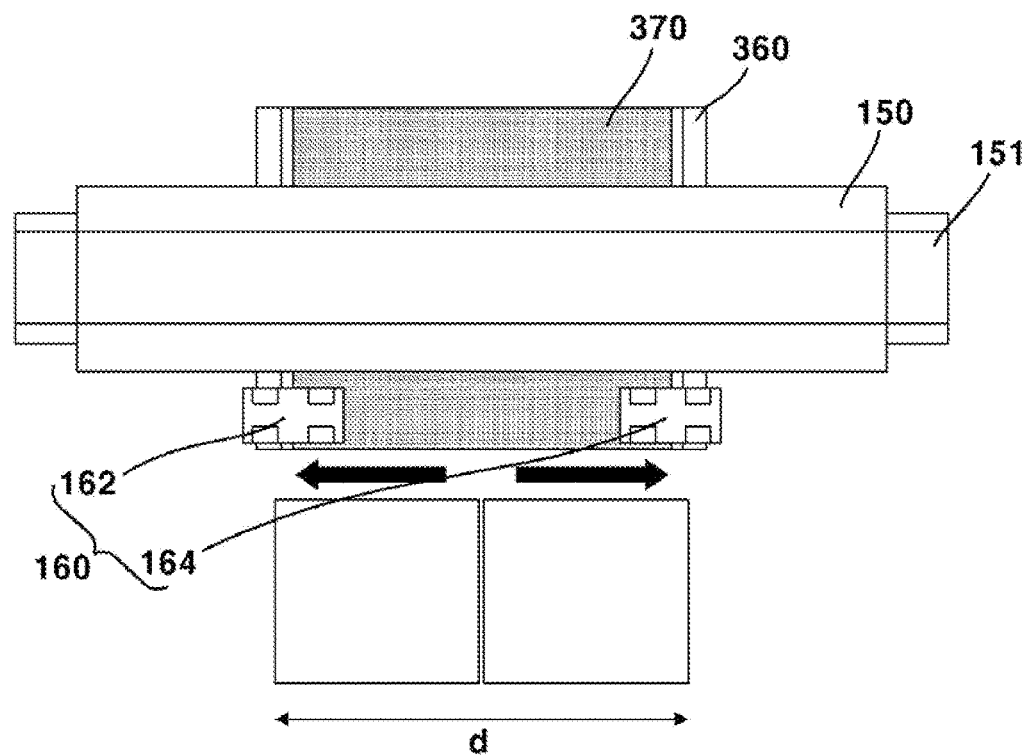
FIG. 12 is a side view of a first lens driving assembly according to an embodiment of the present invention.
Figure 13:
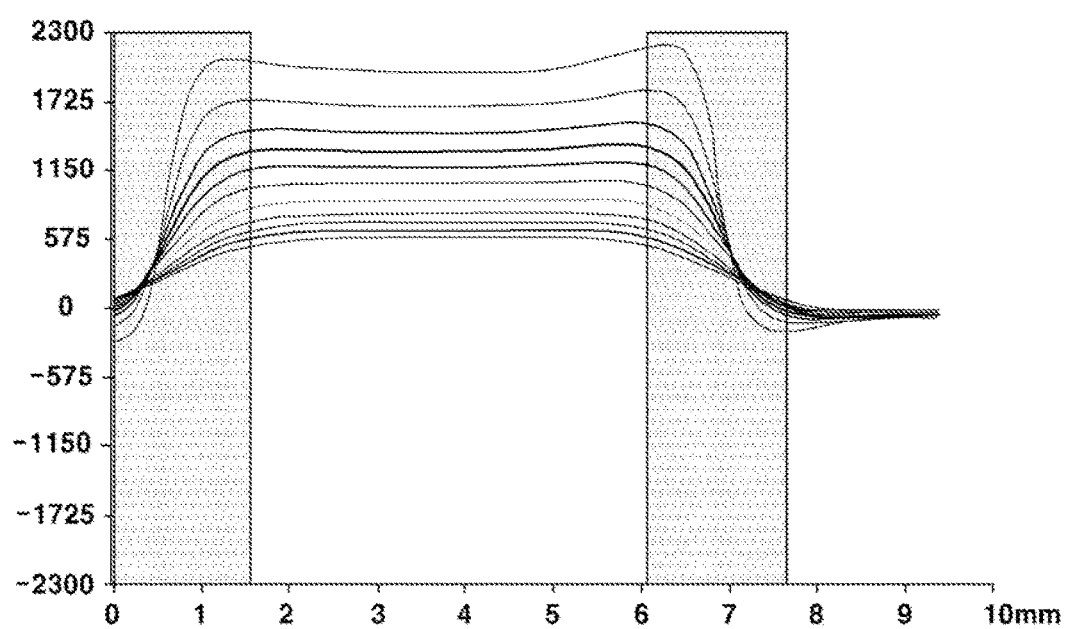
FIG. 13 is a graph illustrating a degree of recognition of a position recognition sensor.

FIG. 12 is a side view of a first lens driving assembly according to an embodiment of the present invention. FIG. 13 is a graph illustrating a degree of recognition of a position recognition sensor.

Referring to FIGS. 12 and 13, in the case when the first-second driving unit 370 moves in the optical axis direction through electromagnetic interaction between the first-first driving unit 150 and the second-first driving unit 370, the recognition degree of the first position recognition sensor 160 through the first position recognition sensor 160 can be found. That is, the stable position of the second-first driving unit 370 can be recognized through the and the two position recognition sensors 162 and 164 that are the first-first position recognition sensor 162 and the first-second position recognition sensor 164.

In this case, the length d between some region of the first position recognition sensor 162 and some region of the first-second position recognition sensor 163 can be equal to or longer than the length in a first direction in the optical axis direction of the second-first driving unit 370. Through this, the recognition of the position of the second-first driving unit 370 may be enhanced.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:
1. A lens assembly driving device comprising:
a first driving unit disposed on a housing;
a lens assembly disposed in the housing; and
a second driving unit disposed on the lens assembly and facing the first driving unit,
wherein the lens assembly comprises a first lens assembly and a second lens assembly,
wherein the second driving unit comprises a first magnet disposed on the first lens assembly and a second magnet disposed on the second lens assembly, wherein the first driving unit comprises a first coil configured to interact with the first magnet and a second coil configured to interact with the second magnet, wherein, in an optical axis direction, a first length of the first driving unit is greater than or equal to a first length of the second driving unit, and wherein, in a first direction perpendicular to the optical axis direction, a second length of the first driving unit is shorter than a second length of the second driving unit.

2. The lens assembly driving device of claim 1, wherein at least one of the first magnet and the second magnet is configured such that a first surface and a second surface opposite to the first surface have different polarities.

3. The lens assembly driving device of claim 1, wherein the first driving unit comprises a first yoke, and wherein the first coil is wound around the first yoke.

4. The lens assembly driving device of claim 2, wherein the second driving unit comprises a second yoke, and wherein the second yoke is disposed between the first lens assembly and the first magnet to be in contact with at least two surfaces of the first magnet.

5. The lens assembly driving device of claim 1, wherein the first coil is disposed at a center of the first magnet in the first direction perpendicular to the optical axis direction.

6. The lens assembly driving device of claim 1, further comprising a position recognition sensor recognizing a position of the second driving unit, wherein the position recognition sensor is disposed above or below the first driving unit.

7. The lens assembly driving device of claim 6, wherein the position recognition sensor is disposed at a corresponding position between a lateral surface and a center of the first driving unit.

8. The lens assembly driving device of claim 6, wherein the position recognition sensor comprises a plurality of position recognition sensors, and wherein the plurality of position recognition sensors is disposed spaced apart from each other in the optical axis direction.

9. The lens assembly driving device of claim 1, further comprising a guide part disposed on the housing, wherein the guide part extends in the optical axis direction, and wherein the first lens assembly moves along the guide part.

10. The lens assembly driving device of claim 9, further comprising a guide ball disposed between the second lens assembly and the housing.

11. The lens assembly driving device of claim 10, wherein the guide ball is disposed opposite to the guide part with respect to an optical axis.

12. A camera module comprising:

an image sensor; and the lens assembly driving device of claim 1, wherein the image sensor is disposed so that the image sensor receives a light passing through a lens of the lens assembly of the lens assembly driving device.

13. A portable device comprising the camera module of claim 12.

14. A lens assembly driving device comprising:

a housing;

a lens assembly disposed in the housing and comprising a lens;

a magnet disposed on the lens assembly;

a substrate disposed on the housing; and a coil disposed on the substrate and configured to interact with the magnet, wherein the lens assembly comprises a first lens assembly and a second lens assembly, wherein the magnet comprises a first magnet disposed on the first lens assembly and a second magnet disposed on the second lens assembly, wherein the coil comprises a first coil configured to interact with the first magnet and a second coil configured to interact with the second magnet, wherein, in an optical axis direction, a first length of the first coil is greater than or equal to a first length of the first magnet, and wherein, in a first direction perpendicular to the optical axis direction, a second length of the first coil is shorter than a second length of the first magnet.

15. The lens assembly driving device of claim 14, at least one of the first magnet and the second magnet is configured such that a first surface and a second surface opposite to the first surface have different polarities.

16. The lens assembly driving device of claim 14, further comprising a guide part disposed on the housing, wherein the guide part extends in the optical axis direction, and wherein the first lens assembly moves along the guide part.

17. The lens assembly driving device of claim 3, wherein the first driving unit comprises a third yoke, and wherein the second coil is wound around the third yoke.

18. The lens assembly driving device of claim 4, wherein the second driving unit comprises a fourth yoke, and wherein the fourth yoke is disposed between the second lens assembly and the second magnet to be in contact with at least two surfaces of the second magnet.

19. The lens assembly driving device of claim 5, wherein the second coil is disposed at a center of the second magnet in the first direction perpendicular to the optical axis direction.

* * * * *